(12) United States Patent
Krause et al.

(10) Patent No.: US 8,856,827 B1
(45) Date of Patent: Oct. 7, 2014

(54) SYSTEM FOR CONVEYING AND REPRODUCING IMAGES FOR INTERACTIVE APPLICATIONS

(75) Inventors: Edward A Krause, Saratoga, CA (US); Peter A Monta, Palo Alto, CA (US)

(73) Assignee: UV Networks, Inc., Cupertino, CA (US)

( * ) Notice: Subject to any disclaimer, the term of this patent is extended or adjusted under 35 U.S.C. 154(b) by 178 days.

(21) Appl. No.: 13/085,468

(22) Filed: Apr. 12, 2011

Related U.S. Application Data

(60) Provisional application No. 61/323,316, filed on Apr. 12, 2010, provisional application No. 61/472,615, filed on Apr. 6, 2011.

(51) Int. Cl.
*G06F 13/00* (2006.01)

(52) U.S. Cl.
USPC .............................................. 725/38; 725/37

(58) Field of Classification Search
None
See application file for complete search history.

(56) References Cited

U.S. PATENT DOCUMENTS

| | | |
|---|---|---|
| 2002/0120942 A1 | 8/2002 | Avison |
| 2005/0204382 A1 | 9/2005 | Ellis |
| 2006/0059513 A1 | 3/2006 | Tang et al. |
| 2007/0032720 A1* | 2/2007 | Koivukangas et al. ....... 600/407 |
| 2007/0229496 A1* | 10/2007 | Adams, Jr. .................... 345/419 |
| 2008/0211825 A1* | 9/2008 | Sunakawa et al. ............ 345/581 |
| 2009/0225828 A1 | 9/2009 | Perlman et al. |
| 2010/0050077 A1* | 2/2010 | Ryman ......................... 715/704 |
| 2011/0134120 A1* | 6/2011 | Antonyuk et al. ............ 345/426 |

* cited by examiner

*Primary Examiner* — Brian T Pendleton
*Assistant Examiner* — Jean D Saint Cyr
(74) *Attorney, Agent, or Firm* — Patents and Licensing LLC; Daniel W Juffernbruch

(57) ABSTRACT

A system for conveying and reproducing images for use with interactive applications is described. The system includes one or more application modules producing images for a display, and a display server for deriving encoded representations of the images and forwarding them to one or more clients. The client includes one or more user input devices such as a touchpad or touchscreen, and forwards information derived from the data received from these devices to the display server. The information is also used locally to modify reconstructed images derived from the encoded image representations received from the display server. The modified reconstructed images are displayed on a video screen.

20 Claims, 13 Drawing Sheets

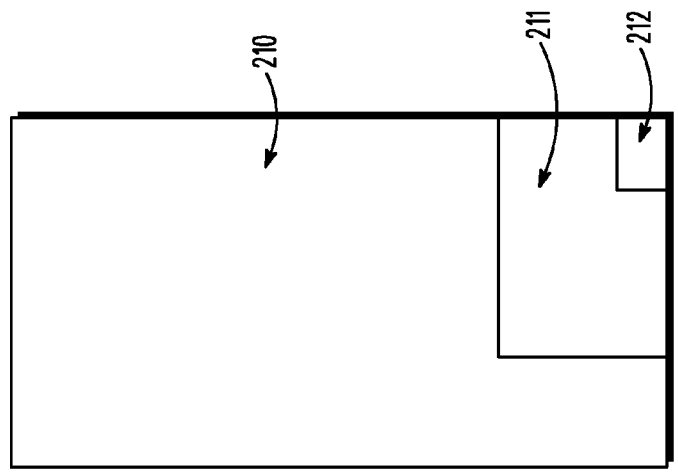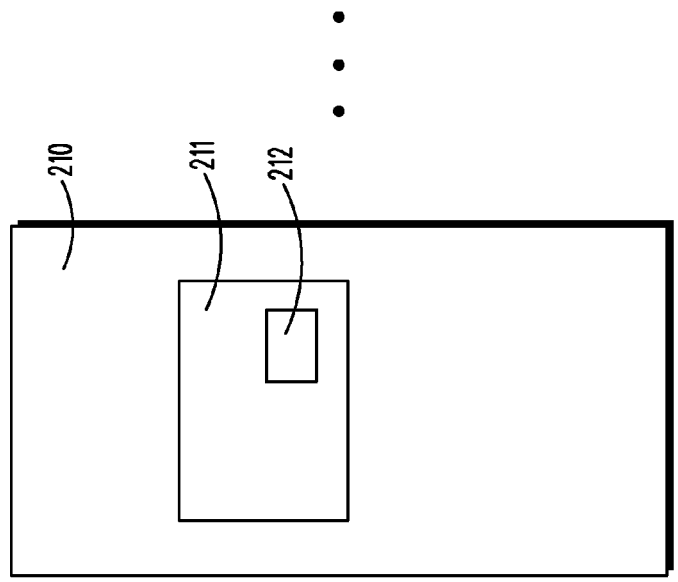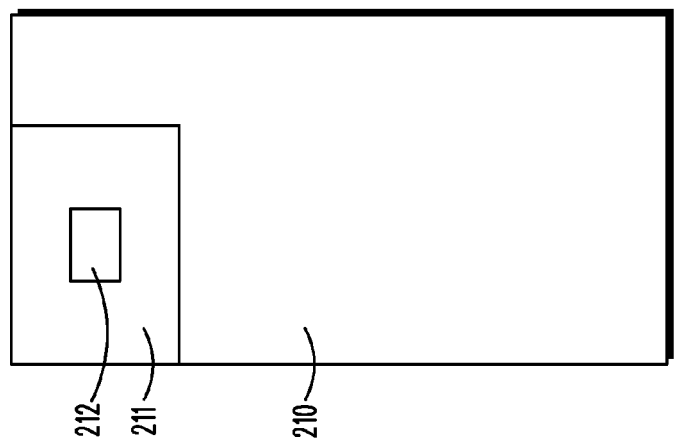
FIG. 6

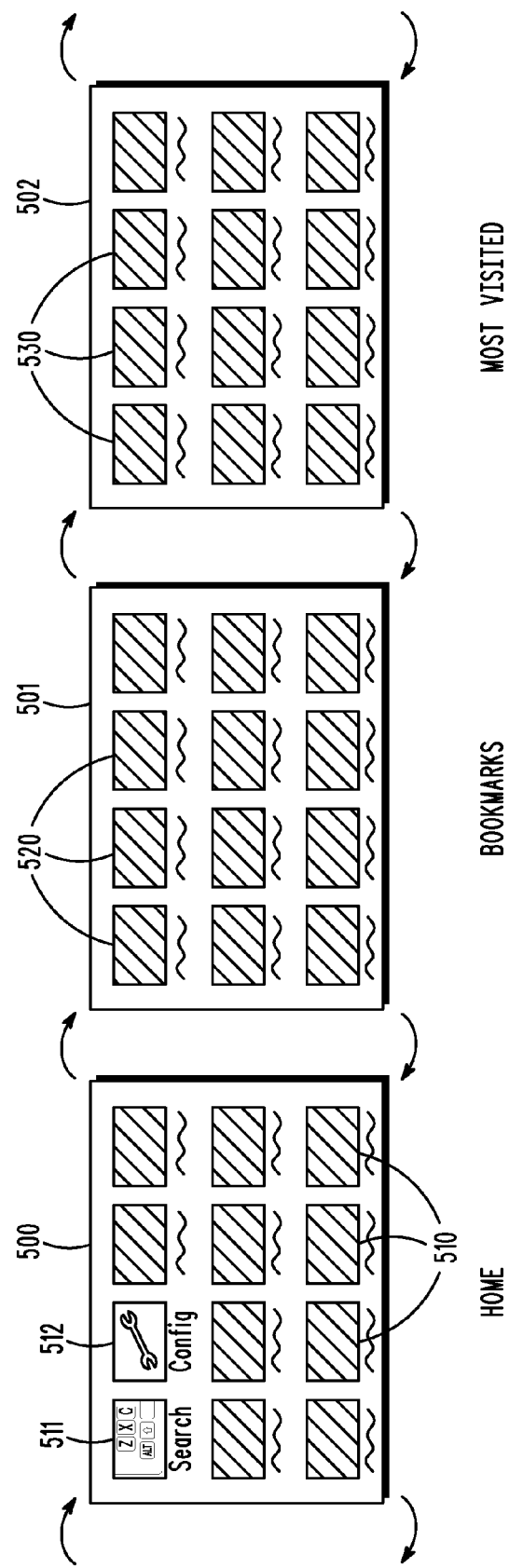

SYSTEM FOR CONVEYING AND REPRODUCING IMAGES FOR INTERACTIVE APPLICATIONS

BACKGROUND OF THE INVENTIONS

1. Technical Field

The present inventions relate to image rendering and, more particularly, relate to image rendering with input devices.

2. Description of the Related Art

Multi-touch input devices have been introduced during the last few years as computer-controlling replacements for the traditional combination of keyboard and mouse. Today, a touchpad can be found on most portable lap-top and net-top computers, and touchscreens have become popular with smaller mobile devices such as smart phones and tablet computers. Although more expensive than touchpads, touchscreens have the advantage of being able to precisely select any portion of the display with minimal effort. The user simply touches the screen at the location of interest. Although the same action can be achieved with a touchpad, this becomes more of a trial-and-error process. Typically, the user first moves a pointer to the desired location by moving one finger along the touchpad while viewing the display for visual feedback. Depending on the application software that is running, the pointer may not even be visible until the pad is touched. In some cases, the position may be determined by the location on the pad where the touch is detected, and the user must first touch the screen before knowing the direction in which the pointer needs to be moved. Then once the pointer has been moved to the correct position on the display, the action needs to be completed, typically by removing the finger from the pad and then tapping the pad while insuring that the pointer does not slip away from the chosen spot. In spite of these extra steps, a touchpad may be preferred over a touchscreen in certain cases. In particular, the touchscreen may be the more convenient option when a large display is involved. In such cases, it may be easier, and even faster, to move one or more fingers over a small touchpad than to approach a large screen and apply contact at the appropriate spot. Perhaps the best example of a product which is well-suited for a touchpad interface, and not so well suited for a touchscreen interface, is the multimedia device used to display video in a typical television viewing setting.

Today, the controlling device that is almost invariably used for viewing television is the remote control, typically designed with multiple hard buttons, each mapped to a specific function. Some of the more expensive remote control devices may use programmable buttons, and some of these buttons may even be displayed on a touchscreen display. However, these controllers still behave in the conventional way. When a button is touched it simply triggers the action that it was programmed to perform. There are benefits to replacing the remote control with a touchpad control device, but this may be a matter of personal preference. For example, the viewer who cannot see his remote control, either because he lacks vision-correcting lenses or because the room is simply too dark, may prefer an on-screen menu-driven display with a hand-held touchpad device for control. Another advantage, assuming that the on-screen menus are superimposed over a viewable program, is that the viewer may prefer to keep his eyes focused on the screen while making adjustments. But perhaps the most important advantages of the touchpad device will be realized only after the functions of the television set-top box and the personal computer become integrated into a common multimedia computing device.

Previous attempts to incorporate the more interactive computer-based activities, such as web browsing, into the television viewing environment have met with limited success. This result can probably be attributed to the shortcomings of the user interface. An interface which approximates the traditional keyboard and mouse may not be ideal for a television viewing setting where one or more viewers may be seated comfortably but at a greater distance from the screen. Unfortunately, due to this increased distance, the viewer may have trouble reading the same web pages or documents that would be easily readable if the same images were displayed in a typical computer setting. However, the lack of readability is not the real problem. Instead, the real problem is that the controlling device hardware and the user interface software prevents the viewer from conveniently correcting this and other problems associated with the more interactive computer applications. Such problems are seldom encountered while engaging in the more passive activity of watching television.

SUMMARY OF THE INVENTIONS

A first object of the invention is to enable the interactive applications typically associated with desktop computers to become more convenient in alternative settings such as the television viewing environment. The convergence between the television and the computer is thereby advanced. Additional benefits include the improved efficiencies associated with a common distribution system for television and internet content, and the use of interactivity, either to enable targeted advertising, or to improve the television viewing experience. A second object of the invention is to reduce the incremental cost of the hardware needed to implement the interactive applications. For example, if the convenience of an application implemented in a television viewing device is improved, then the need for expensive desktop computers may be lessened.

A system for conveying and reproducing images is described. The system includes one or more application modules, such as a web browser or email client, producing images for a display. The system also includes a display server for deriving encoded representations of the images and forwarding them to one or more clients. The client includes one or more user input devices such as a touchpad or touchscreen, and forwards information derived from the data received from these devices to the display server. The information is also used locally to modify reconstructed images derived from the encoded image representations received from the display server. The modified reconstructed images are displayed on a video screen.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein:

FIG. 6 illustrates when a Desktop Frame Buffer is a sub-window into a larger image according to one embodiment of the present inventions;

FIG. 12A illustrates a home page accessible to a user which may be accessed at any time by reserving a unique action according to one embodiment of the present inventions;

FIG. 12B illustrates an alternative bookmark page accessible to a user according to one embodiment of the present inventions;

FIG. 12C illustrates an alternative most visited page accessible to a user according to one embodiment of the present inventions.

DETAILED DESCRIPTION OF THE PREFERRED EMBODIMENTS

Figure 1:
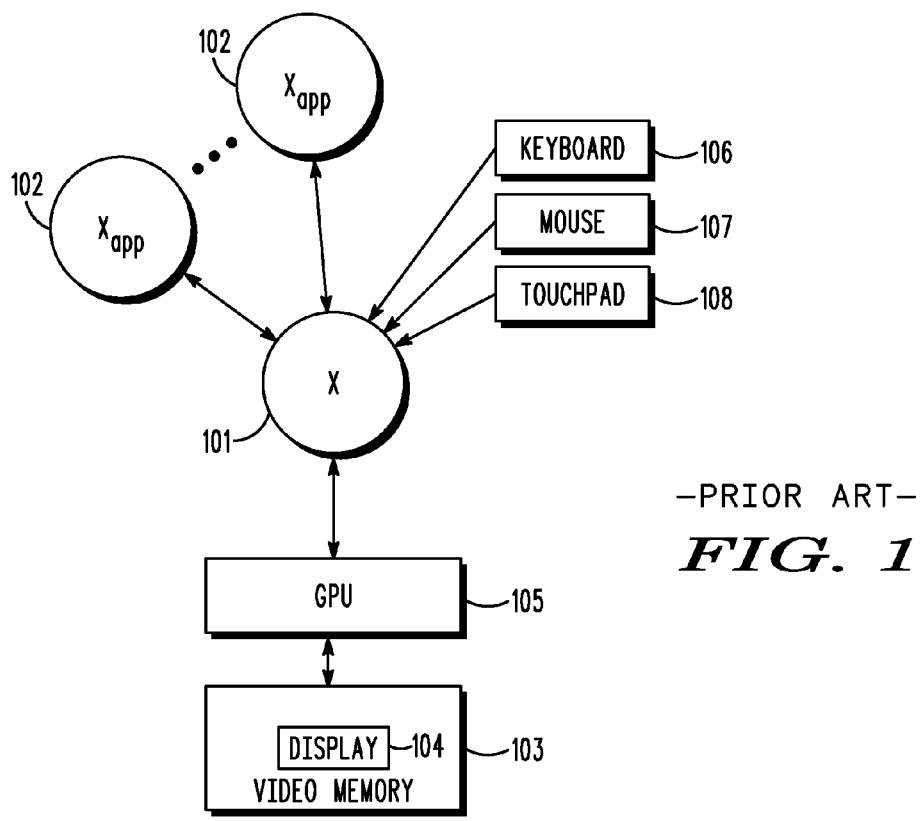
FIG. 1 illustrates a diagram representing a computer-based display management system is shown with input devices attached as console devices according to the prior art.

A simplified diagram representing a typical computer-based display management system is shown in FIG. 1. In this example, the display server is X window manager 101. Different modules Xapp 102 represent the one or more software processes generating images to be displayed on the common screen managed by server 101. For example, a first application may be a web browser, serving not only as a link to the internet, but also as a local renderer of web pages comprising the user interface for a second application. This second application may be the media player which decodes compressed media files and presents a sequence of video frames to be displayed in a separate window, also handled by server 101. In a television viewing setting, this window would typically be presented in full-screen mode and would be the only visible window while the media player is active.

One of the functions of server 101 is to manage the allocation of video memory. As shown in FIG. 1, a section of video memory 103 is reserved for the pixels that are displayed on the screen 104. In most modern systems, access to video memory involves special hardware known as a Graphics Processing Unit (GPU) 105. The GPU is comprised of dedicated hardware enabling very high data transfer rates to and from video memory 103. GPU 105 may also include dedicated hardware and enable computationally intensive data processing tasks to be offloaded to this dedicated hardware via standardized software interface languages such as OpenGL and OpenCL, or vendor-specific interfaces such as Nvidia's CUDA language. A GPU that is selected for media processing applications is also likely to include dedicated hardware for decoding and, in some cases, encoding video data streams. Interfaces for managing video decoding and encoding operations include OpenMAX as well as vendor-specific interfaces such as Nvidia's VDPAU.

Figure 2:
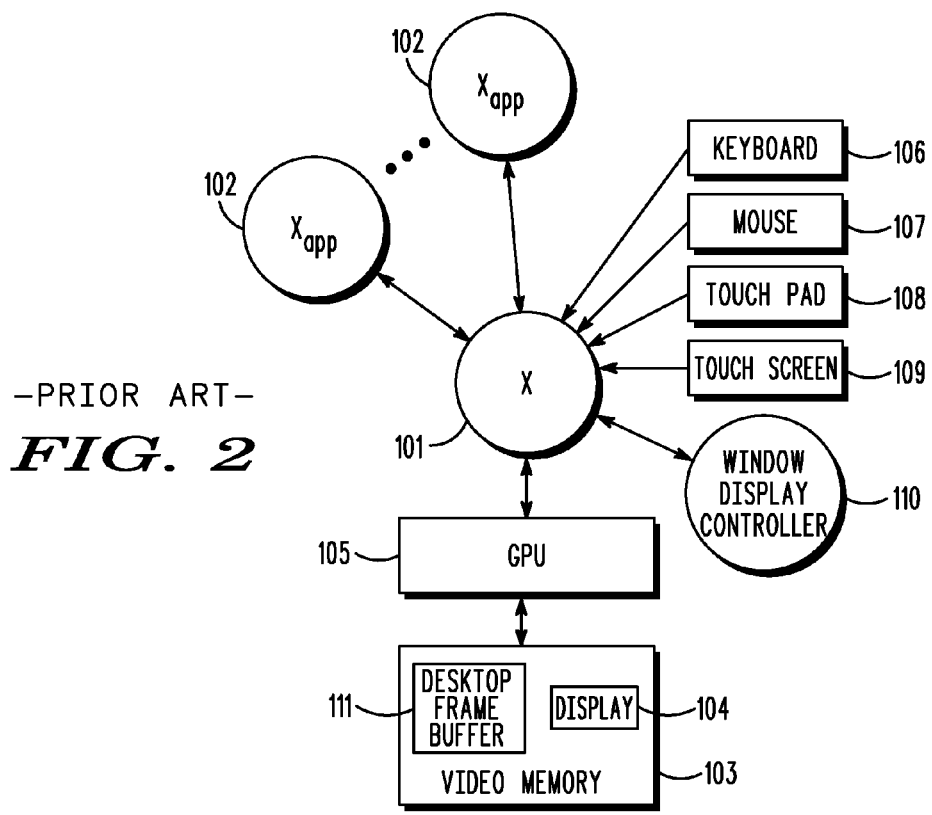
FIG. 2 illustrates a diagram representing a computer-based display management system with a touchscreen added as an input device according to the prior art.

User input is provided to server 101, usually from a keyboard 106, mouse 107, or touchpad 108. These input devices may be attached as console devices as shown in FIG. 1, or networked and associated with a particular application. In FIG. 2, a touchscreen 109 has also been added to the list of input devices. Both touchscreens and touchpads are very convenient devices, not only for feeding user input to the various applications, but also for manipulating the appearance of the window that is displayed on the user's screen. This manipulation is performed in conjunction with the Window Display Controller 110 which has also been introduced in FIG. 2. Also notice that the video memory in FIG. 2 now contains separate sections for storing the Desktop Frame Buffer pixels 111 and the pixels comprising the actual displayed image 104. In this case, the displayed image 104 represents a manipulated version of the representation in the Desktop Frame Buffer 111. Two of the more useful manipulation functions implemented in the GPU 105 based on user input received and processed by the Window Display Controller 110, are window zooming and window panning.

Figure 3:
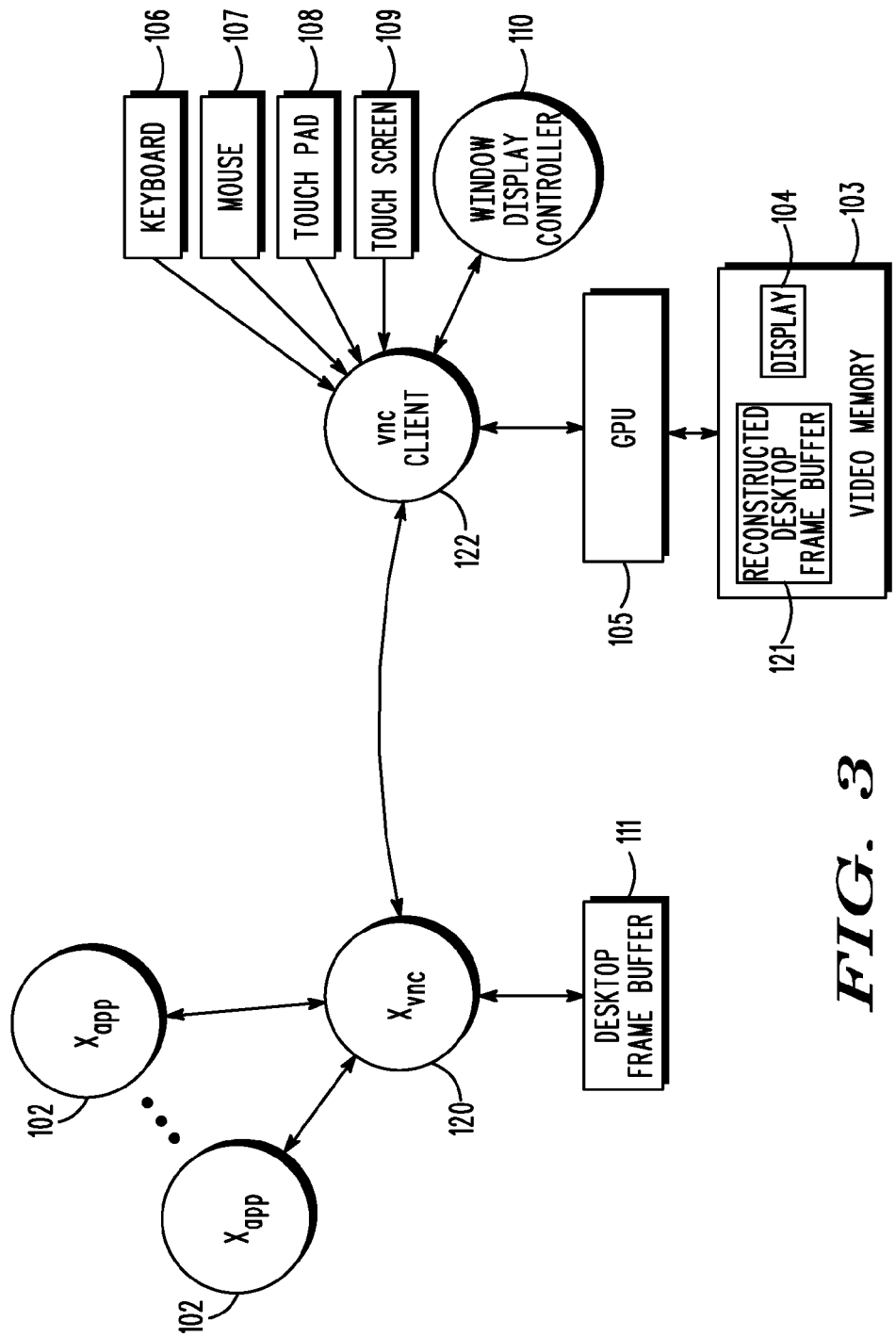
FIG. 3 illustrates an example of a server synchronized with a client using Virtual Network Computing (VNC) according to one embodiment of the present inventions.

The system of FIG. 2 can be extended to support the synchronizing of the display images with one or more client devices. In the example of FIG. 3 the server is synchronized with a client using Virtual Network Computing (VNC). In this example, server 101 is replaced by Xvnc server 120 which uses the RFB protocol to receive user input and convey the desktop display to client 122. However, other protocols employing different methods of image compression could be used instead. The Desktop Frame Buffer 111 now resident in server-side memory is reconstructed in a section of video memory 103 of the client, by continuously checking for changes at server 120 and then communicating the changed regions of memory to each connected client 122. This section of corresponding video memory is the Reconstructed Desktop Frame Buffer 121. In this case the user input devices (keyboard 106, mouse 107, touchpad 108, touchscreen 109) are associated with the one or more clients. Note that the user input may be provided by a particular client 122 while the output video is reconstructed and displayed by another. Also on the client side are the Window Display Controller 110, GPU 105, and video memory 103. GPU-based hardware acceleration at the client insures that image manipulation effects, such as zooming and panning, will be fast and responsive even if frame buffer synchronization occurs at a slower rate as determined by the speed of the interconnecting link between server 120 and client 122 and the efficiency of the communication protocol.

Figure 4:
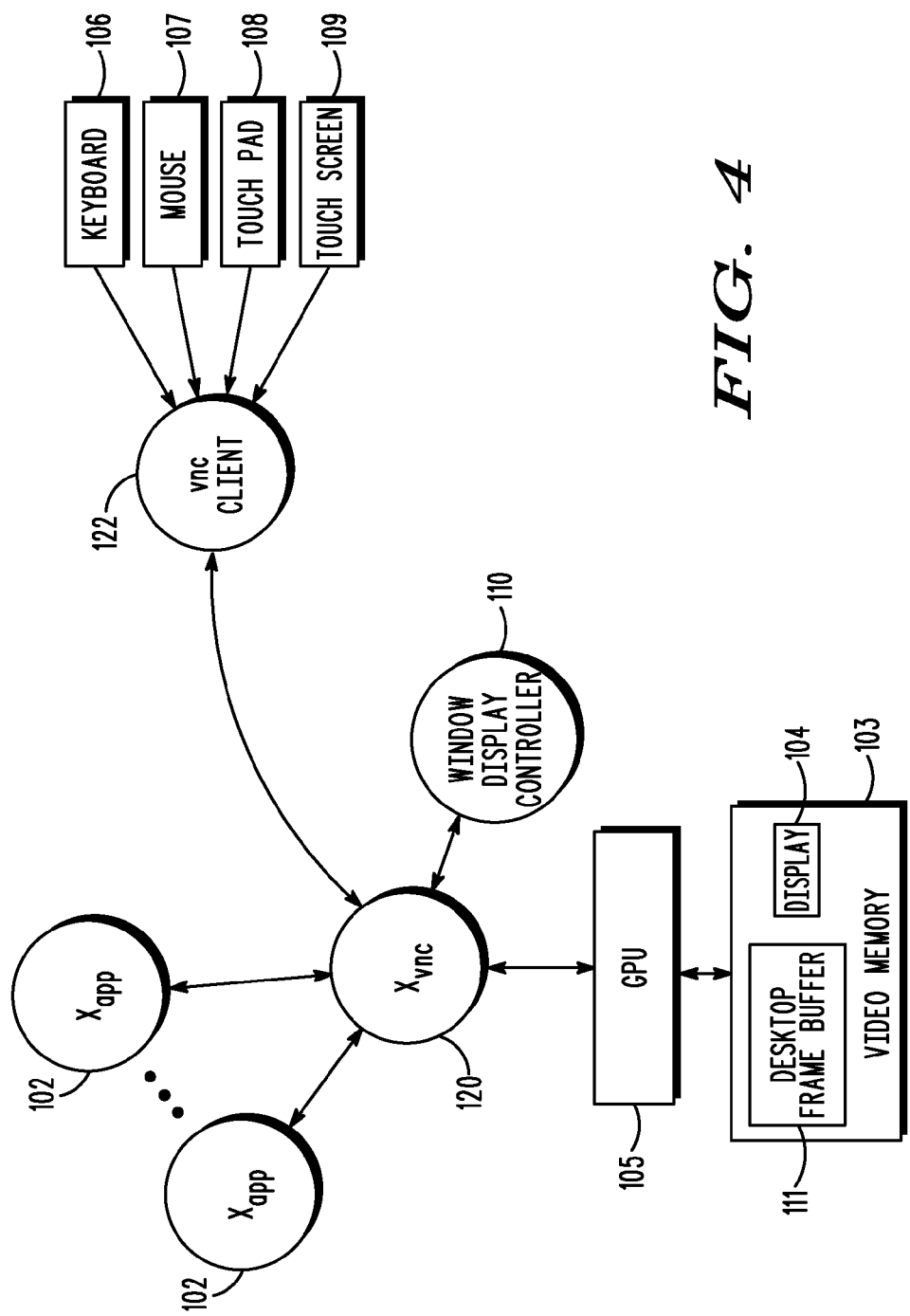
FIG. 4 illustrates a system combining the system of FIG. 2 and the VNC example of FIG. 3 according to one embodiment of the present inventions.

A system combining the previous system of FIG. 2 and the VNC example of FIG. 3 is shown in FIG. 4. In this case, VNC is used as a method of conveying user input from one or more keyboard 106, mouse 107, touchpad 108, or touchscreen 109 devices to Xvnc server 120. All display processing remains on the side of Xvnc server 120. This solution has the advantage of fast synchronization between the images sourced by each X application 102 and the images in display memory 104, while still benefiting from the simplified VNC interface. This example does not apply in cases where the display cannot be co-located with sever 120.

One of the most important obstacles to overcome when attempting to run computer applications in a television viewing setting is the size of the text that is often presented on the screen. Applications such as web browsing, email management, and document review all involve a considerable amount of text, and these applications are often designed for close-up viewing. One way to overcome this problem is to provide the user with a convenient means for resizing the fonts and other imagery. Unfortunately, zooming is an operation that requires a considerable amount of image processing, and of the applications which support zooming, almost all depend on a software-based implementation. One may claim that a software implementation is sufficient when running on costly high-end computer hardware, or systems with relatively low-resolution displays, but unfortunately most multimedia home-theater or set-top box implementations employ low cost computing hardware and high quality high definition displays. Software-based zooming operations implemented on such systems are likely to be very slow with screen updates generated at a very low rate. Fortunately, it is common for even low-cost hardware to include a GPU and the GPU is very well suited for implementing the zoom function. However, since it may not be practical to acquire and modify the source code corresponding to each and every application in order to take advantage of existing GPU hardware, an alternative solution is proposed.

One viable option is to apply a GPU-assisted zoom operation to the final output window that is generated by the server 101 in FIGS. 1 and 2, the VNC client server 122 in FIG. 3, or the Xvnc server 120 in FIG. 4. User input for controlling the zooming operation is received by the Window Display Controller 110, preferably from a touchpad 108 or touchscreen 109 input device, and processed to generate appropriate commands (using OpenGL for example) which are then submitted to the GPU 105. Once implemented, the solution can be applied to all applications that generate video for a common display. It does not matter which window (or combination of windows) is selected for rendering into the Desktop Frame Buffer 111 or Reconstructed Desktop Frame Buffer 121. Once rendered, the GPU 105 will be capable of zooming into any section of this buffer under the control of Window Display Controller 110.

Figure 5:
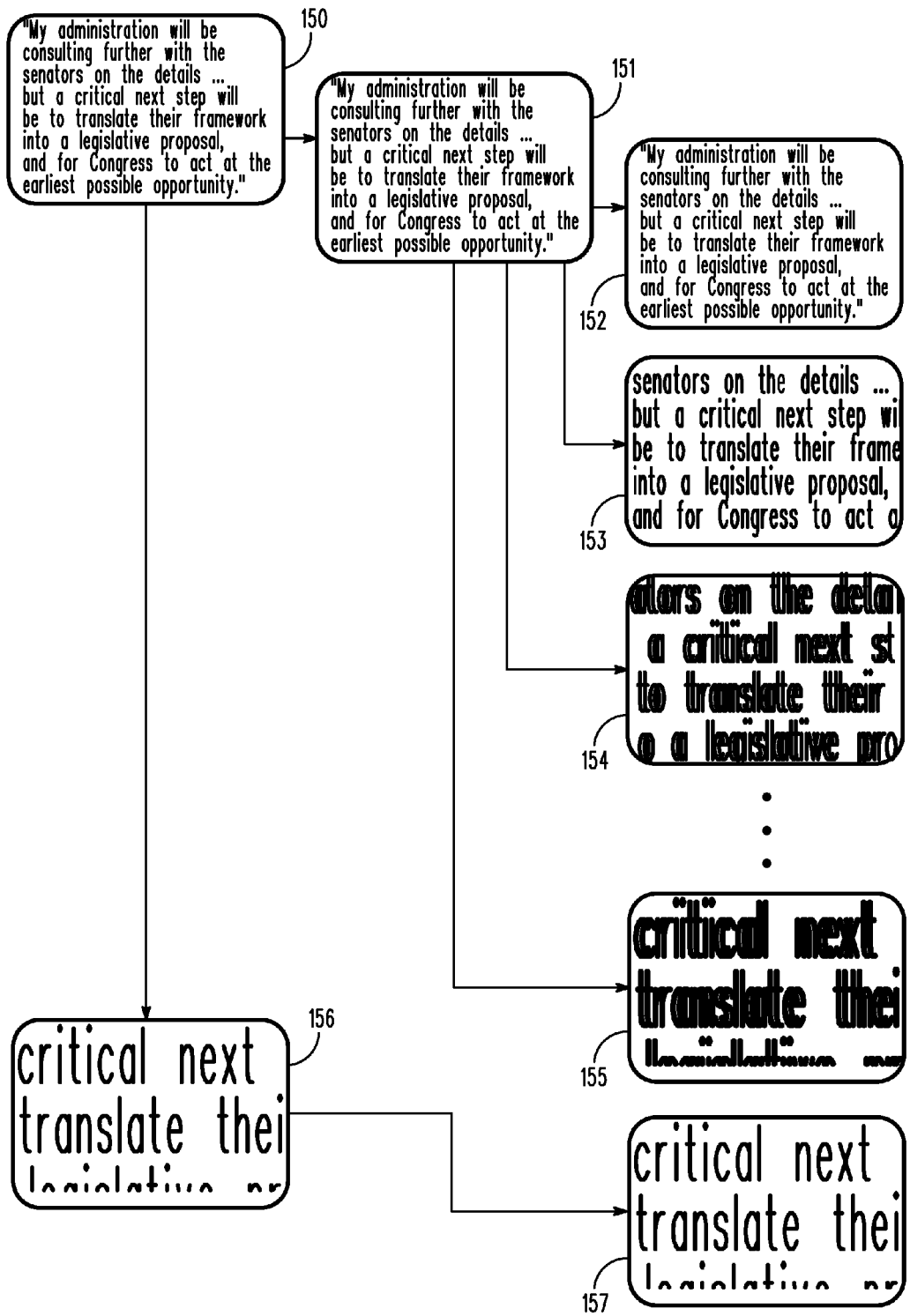
FIG. 5 illustrates text at different zoom magnification levels rapidly using one processing and then transitioning to higher quality rendition processing when available according to one embodiment of the present inventions.

One of the disadvantages of zooming into the Desktop Frame Buffer instead of implementing the zoom function at application module 102, is that additional information is unavailable for enhancing the image as the magnification level is increased. Often when enlarging general imagery, no such additional information will exist, but there are a few exceptions. For example, the resolution of a high quality photograph may have been reduced to match the resolution of the display 104, but if the user chooses to zoom up on a portion of the display 104, then a better result can be achieved by reprocessing the original photograph than by reprocessing the low resolution copy. For this reason, one might choose to generate the entire desktop buffer 111 or 121 at a resolution exceeding that of the display device, with the understanding that the benefit will not be realized until the viewer chooses to exercise the zoom option. Text is another example. When text is generated by a particular application, the underlying data is generally understood to be text and is rendered using a chosen font and a chosen font size. Certainly a higher quality result is obtainable by repeating the font rendering step with an increased font size, than by enlarging an existing image. However, as shown in FIG. 5, it is possible to rapidly and smoothly zoom image 150 to a desired magnification level used GPU-assisted processing and then transition to a higher quality rendition once it becomes available. This result is achieved by first generating copy 151 of the section of the Desktop Frame Buffer that is currently being displayed. The GPU can produce such a copy almost instantly. Although the GPU could also enlarge the image to the final size almost equally fast, it is usually desirable to enlarge the image gradually so that the adjustment appears smooth and is easily tracked by the viewer. Therefore, each successive image 152, 153, 154, . . . 155 is generated from image copy 151, as the magnification level is gradually increased until the desired final magnification level is achieved. At the same time, a higher quality version of the result (156) is prepared by adjusting the font size and repeating the font rendering step. Although it would be possible to infer the text characters from the previously rendered image, it is usually simpler to instruct the original application to repeat the font rendering step with the new magnification setting. Since intermediate magnification levels 152, 153, 154, 155 are handled by the GPU, the application only needs to render to the final magnification level. When the rendering is complete, the resulting image is simply copied to the display section of video memory as image 157 replacing image 155. The GPU magnification level is then reset to one.

Although there is a clear benefit to replacing the magnified image with a higher quality representation, such as the regenerated font images described in this example, the improved quality may be difficult to perceive in a television viewing setting where the viewer may be several feet away from the screen. Clearly the text may become much more readable as it becomes magnified by interpolation, but experiments have shown that most of the improvement in readability occurs as a result of the magnification step and much less improvement is attributable to the substitution of a higher quality representation in place of the magnified version. Of course, this also depends on the original size of the text, but if the application is configured to avoid using font sizes smaller than a preset minimum, then this result will generally hold true. Also, if the substitution step is omitted, then there is no need to communicate with the one or more applications responsible for producing the displayed imagery. However, if the substitution step is in fact implemented, then steps should be taken to insure that the application enlarges the image to match the magnification of the interpolated version without rearranging content features.

In addition to controlling the zoom factor, the user should also be provided with convenient means for moving the displayed window both horizontally and vertically throughout the entire desktop frame buffer. If the user zooms into a the frame buffer until a particular section of text is easily readable, then it is quite likely that the user will also need to pan horizontally to the right and/or vertically down the page in order to finish reading a section of text. As with the zoom function, panning instructions are preferably received as a response to gestures applied to a touchpad or touchscreen input device and processed by the Window Display Controller. The Window Display Controller than provides the coordinates of the rectangle of pixels that is to be copied form the Desktop Frame Buffer to the Display memory. For example, these coordinates may be entered in the form of OpenGL instructions which are eventually processed by the GPU.

A complication arises when the Desktop Frame Buffer is itself a sub-window into a larger image, as illustrated in FIG. 6. For example, consider the web browser application which fills display window 212 and desktop window 211 with a portion of a larger web page 210. In order to view the remainder of the web page, one may need to instruct the web browser application to scroll down or scroll to the right. Although the Window Display Controller can easily manage the panning of display window 212 within desktop window 211, extra steps are needed to view the areas lying beyond the boundaries of desktop window 211. The web browser application must be instructed to shift the position of desktop window 211 within the larger application window 210 but it would be advantageous to hide this step from the user. The user must already manage the position of the pointer and the position of display window 212 within desktop window 211, and it would be inconvenient to reserve an additional form of touchpad or touchscreen gesture to manage the position of the desktop window 211 within the application window 210. The proposed solution to this problem is to have the Window Display Controller automatically manage the position of Desktop Window 211. The process is described by the flowcharts in FIGS. 7 and 8.

Figure 7:
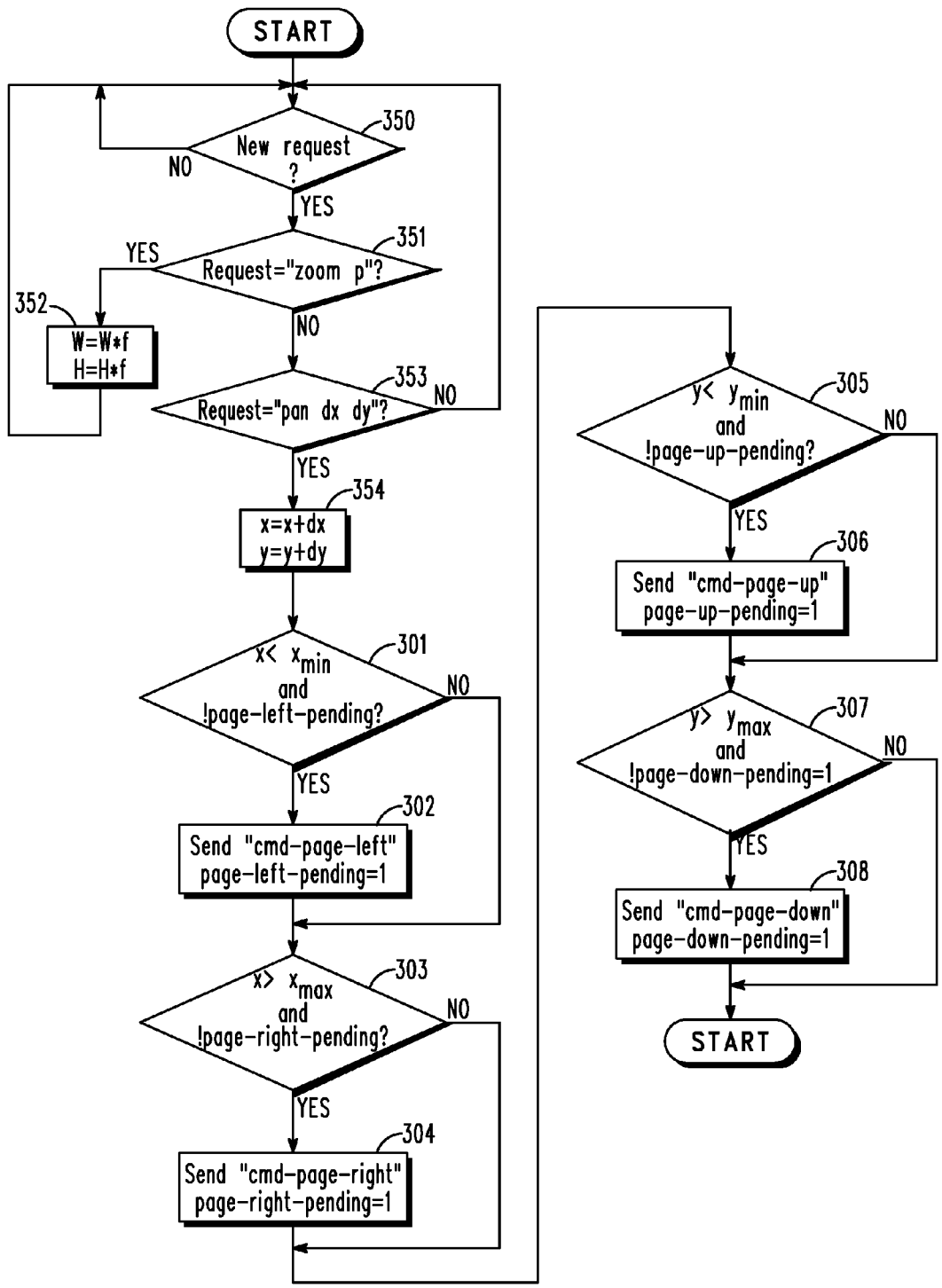
FIG. 7 illustrates a flowchart of a process of a window display controller to manage a position of a desktop window and maintain the current position of the display window centered at coordinates according to one embodiment of the present inventions.

The flowchart in FIG. 7 maintains the current position of the display window 212 centered at coordinates (x, y). Initially, the process waits for the next request at step 350, and if the next request is determined at step 351 to be a zoom request, then the display window dimensions are adjusted at step 352 and the new dimensions are provided to the GPU. Otherwise, it the next request is determined at step 353 to be a pan request, then the position of the display window is adjusted at step 353 and the changes are again forwarded to the GPU. Next at steps 301, 303, 305, and 307, it is determined if the display window has is moved to within a threshold distance (Xmin,Ymin) from the edges of desktop window 211. If this condition has occurred, then an instruction is sent to the source application at steps 302, 304, 306, 308 telling it to readjust the position of the desktop window.

Figure 8:
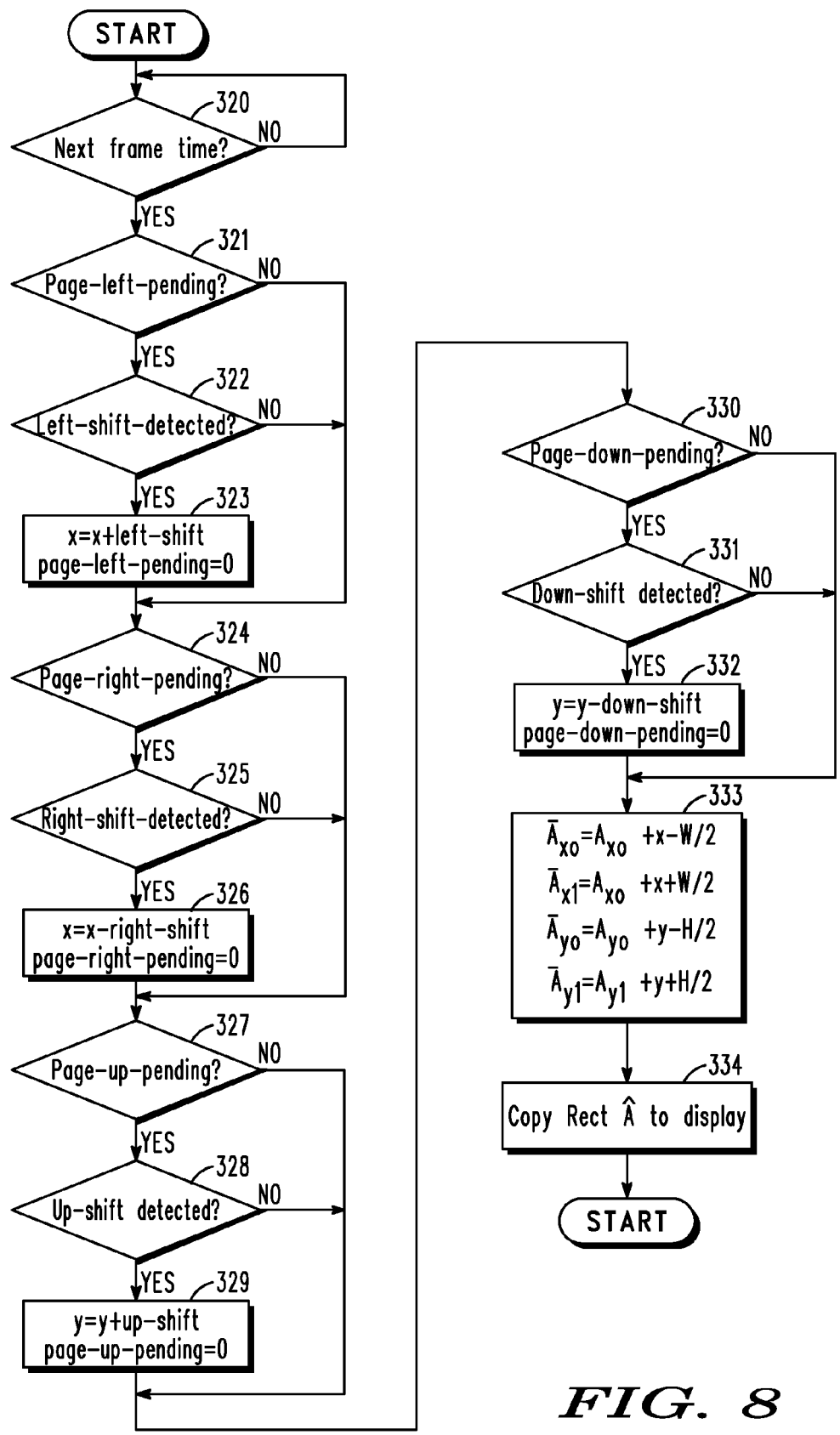
FIG. 8 illustrates a flowchart of a process of a window display controller to manage a position of a desktop window and detect readjustments according to one embodiment of the present inventions.

The flowchart in FIG. 8 detects when these readjustments are implemented by the application process and completes one cycle during each frame interval. The start of the next frame interval is detected at step 320 and the process begins by checking at step 321 if a left-shift request is pending (refer to step 302 of FIG. 7). If it is determined that such a request is pending, then at step 322 it is determined if the application has executed the request. If the request has been executed, then a compensation step is performed at step 323. Since the user may be instructing the Window Display Controller to adjust the position of the display window in a gradual manner, it is important to avoid the larger more sudden jump in position (in this case, to the left) that would occur if compensation step 323 was omitted. Although it is not necessary for the Window Manager Controller to know the magnitude of the position adjustment implemented by the application process, this information could be used advantageously in cases where the completion of the request cannot be inferred by communicating directly with the application process, and must be detected by other means instead. A detection process may involve the same correlation detection algorithms used by well-known motion encoders, and if the magnitude and direction of possible adjustments are known in advance, then the computations involved can be significantly reduced.

Steps 324, 325, and 326 detect and compensate for right-shift requests but are otherwise similar to steps 321, 322, and 324, respectively. Steps 327, 328, and 329 detect and compensate for page-up requests and are also similar to steps 321, 322, and 324, respectively. Finally, steps 330, 331, and 332 detect and compensate for page-down requests but are otherwise similar to steps 321, 322, and 324, respectively.

The final step 334 in FIG. 8 is to copy the rectangle selected at step 333 within the Desktop Frame Buffer to the Display buffer. If the selected rectangle is smaller than the dimensions of the display buffer, than the pixels are scaled during the process of copying, by up-sampling and low-pass filtering. In FIG. 8, the Desktop Frame buffer is assumed to have a top left coordinate of $(A_{x0}, A_{y0})$ and the rectangle to be copied from this buffer has top left coordinates at $(A_{x0}, A_{y0})$ and bottom right coordinates at $(A_{x1}, A_{y1})$. Once the adjustment has been properly compensated as outlined in FIG. 8, the movement of display window 212 will appear smooth and continuous as it repositioned to any location within the application window 210.

In addition to supporting zoom and pan operations, the Window Display Controller must also allow different objects within the display window to be selected by the user. Depending on the application, the user may need to move a pointer or cursor to locate the selectable objects, or the application may permit the user to move instantly from one selectable object to an adjacent selectable object. In either case, an object would be highlighted in some visible way as soon as it becomes selectable. Selecting the object would then produce a pre-programmed action. For example, a new web page may be loaded when running a web browser application and the object that is highlighted and subsequently selected is a URL link. Typically, a highlighted object is selected by hitting the 'enter' key on a keyboard, clicking the left button on a mouse, or by retouching the surface of a touchpad or touchscreen.

One common problem which this invention seeks to overcome is the accidental or unintended selection of objects when using touchpads or touchscreens as user input devices. As the variety of single and multitouch finger gestures increases, so does the probability of error or misinterpretation. Errors may be due to deficiencies in the gesture interpretation algorithms, or they may be attributable to user error. For example, once an object becomes selectable, the user must be very careful not to touch the screen again unless the intention is to trigger the action that is associated with the selectable object. A preferred solution to this problem is to not only restrict the selection action to be a short single tap of a single digit (finger or thumb), but to also require that the tap occur within a limited time interval beginning when the digit is removed from the pad or screen after an object becomes selectable. In addition, we assume that an object becomes selectable only by holding a digit on the pad or screen for a relatively long period of time in order to insure that the intended object is chosen. That is, the user must first hold a single digit on the pad or screen for a relatively long period of time to confirm the choice of objects, and then briefly tap the pad or screen during a finite time window beginning when the digit is lifted from the surface. The process can be further improved by ignoring the location of the short tap on the pad or screen surface. Instead, the location should be recorded before the digit is lifted from the surface to apply the tap. For example, one may use the location that was touched 10 ms prior to lifting the digit from the surface. This will effectively filter out any unintended movements that may occur while lifting the digit from the surface. Such unintended movements could cause a previously highlighted object to become unselectable or worse, an adjacent object could become selectable instead.

Figure 9:
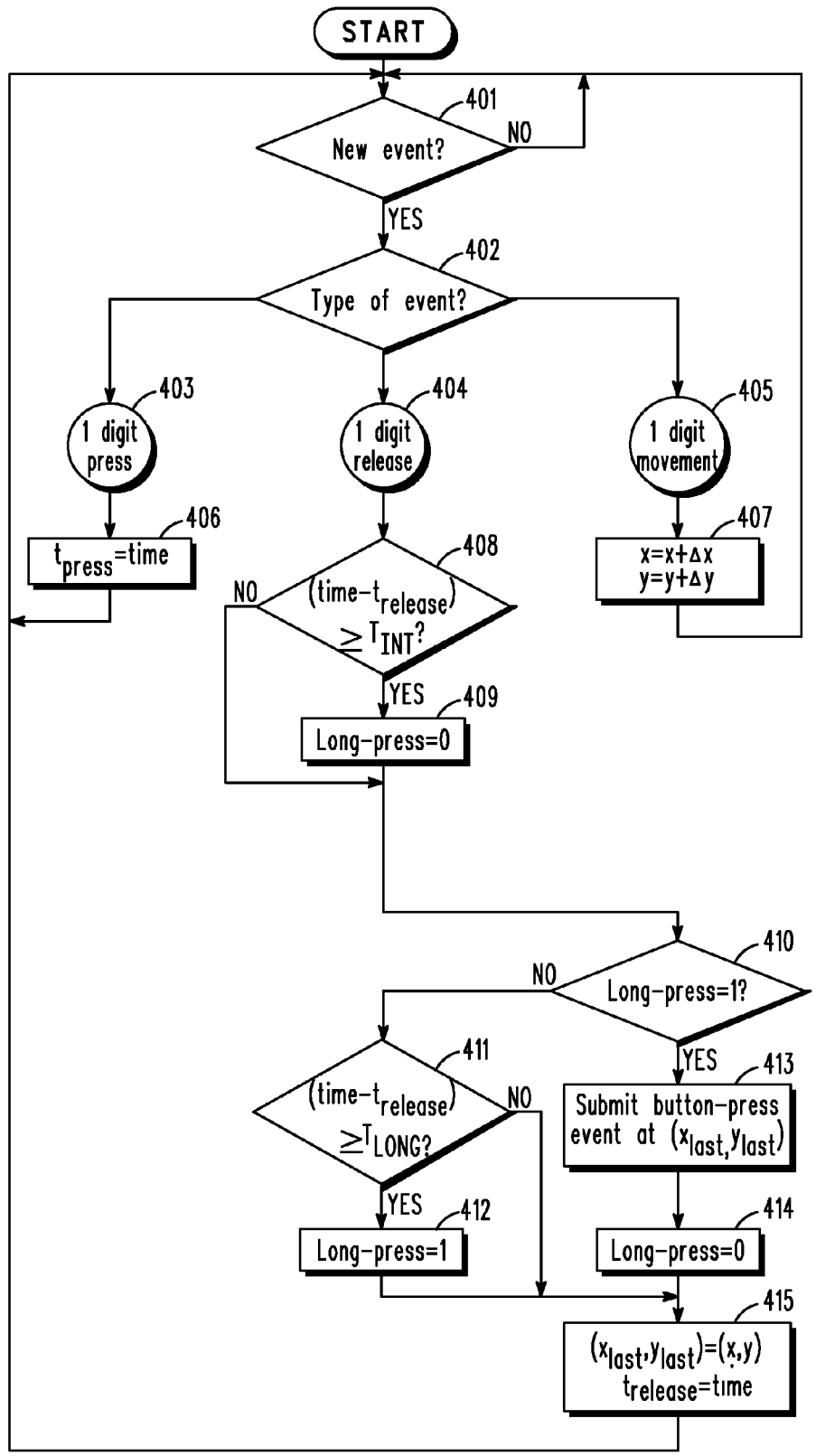
FIG. 9 illustrates a flowchart of a process of moving a pointer to identify objects and tapping a pad or screen to commit a selection according to one embodiment of the present inventions.

The process of moving the pointer to identify objects and then tapping the pad or screen to commit the selection is detailed by the flowchart in FIG. 9. After a new event is detected at step 401, the classification of the event is determined at step 402. In this example, there are three possible event classifications, all involving a single digit: contacting the surface (403), moving along the surface without releasing contact (405), and releasing contact with the surface (404). If classified as a surface contact, then the time of contact is recorded at step 406 before returning to step 401 to await the next event. Alternatively, if the event is classified as a surface movement, then the pointer position is adjusted at step 407 in accordance with the amount of change detected in the touchpad or touchscreen coordinates, before returning to step 401 to await the next event. When classified as a contact release event, the current time is compared with the time of the preceding release event at step 408 to determine if the touch event meets the short tap criterion required for detection of a button press event. If not, the parameter long-press is set to 0 at step 409 causing the test at step 410 to fail. If test 410 fails, then the current time is again compared with the time of the preceding release event, this time at step 411, to determine if the touch event was long enough for the selection to be deemed reliable. If so, the parameter long-press is set to 1 at step 412 thereby enabling the object to become selectable for a short period of time. If the next touch completes during this interval such that the test at step 410 passes, then the button press event is submitted at step 413 along with the coordinates recorded during the preceding contact release event. The parameter long-press is then reset to 0 at step 414 and the coordinates and time associated with the current contact release event are recorded at step 415.

Notice that the button press event is submitted at step 413 with a corresponding location $(X_{last}, Y_{last})$ when a short tap is detected immediately following a long-press touch. This location represents the position of the pointer upon releasing contact with the surface after the long-press touch. As mentioned previously, it may be more advantageous to use the position just prior to releasing contact (for example 10 ms before), and note that the process is easily modified to maintain multiple touch positions during this interval (for example during the last 10 ms). Once the button press event is submitted, the location is evaluated to determined if it matches the position of an existing object. If so, then the action that is associated with the matching object is initiated.

As mentioned previously, one of the advantages of touchscreens is that there is no need to position a pointer or to explicitly identify an object by other means before the object is selected. Instead, the actions of identifying and selecting are naturally combined into the single action of touching the screen at a particular spot. However, since touchscreens may not be suitable for typical television viewing settings, it is advantageous to simplify the two tasks of object identification and object selection. The assumption is that that the user input device is a touchpad or touchscreen configured to behave as a touchpad. Note that the touchscreen could alternatively be configured to display user selectable objects in a format which may or may not match the representation on the main viewing screen, but this option will not be discussed here.

One method of navigation using a touchpad input device is to use one digit to position the pointer or to move among selectable objects, and to use two digits to move the position of the display window within the larger application window. For example, the display window could be positioned by moving two fingers in unison, or alternatively one finger could remain stationary while the movement of the other finger is used to position the display window.

Figure 10:
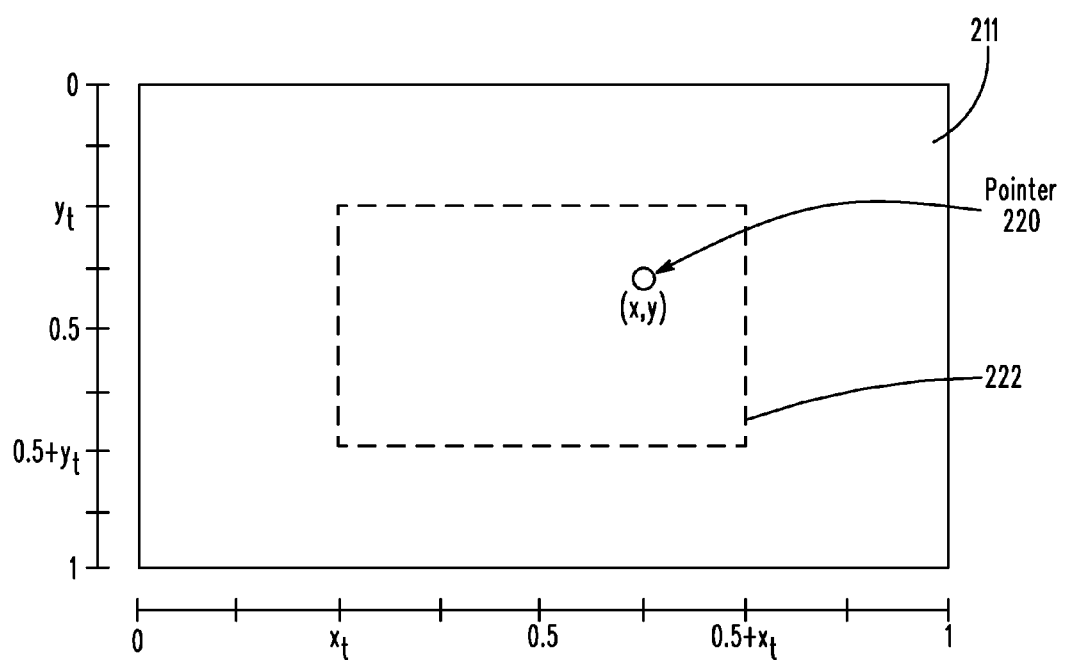
FIG. 10 illustrates a display window with pointer at position (x,y) controlled by the movement of a single digit along the touchpad surface by a second method of navigation according to one embodiment of the present inventions.

A second method of navigation combines the positioning of the pointer (object selection) and the positioning of the display window so that both actions may be controlled by the movement of a single digit along the touchpad surface. This is illustrated in FIG. 10 which shows the entire display window 211 with pointer 220 at position (x,y). Also shown is rectangle 222 with top left coordinates at $(X_t, Y_t)$ and bottom right coordinates at $(0.5+X_t, 0.5+Y_t)$ assuming that the entire display window uses normalized dimensions ranging from 0 to 1 along both axes. As the digit moves along the surface of the touchpad, the pointer moves accordingly. However, if the pointer moves outside the boundaries of the rectangle, then a second action is triggered. Specifically, the display window 211 will begin to move at a rate that is directly related to the extent which the pointer lies outside the boundary. The closer the pointer 222 is positioned towards the boundary of the display window 211, the faster the window is panned until eventually reaching maximum velocity ($V_{max}$) when the pointer is moved to the edge of the display window 211. The window is always panned in the direction that the pointer has been displaced from center. For example, if the pointer is positioned to the left side of the indicated rectangle, then the display window will be positioned more towards the left edge of the application window. Similarly, if the pointer is moved above the indicated rectangle, then the display window will move closer to the top edge of the application window.

As long as the user holds his finger stationary on the pad, the pointer 220 will move at the same speed as the display window 211, and therefore there will be no movement of the pointer relative to the window itself. But if the user releases his finger so that it is no longer touching the screen, then the pointer velocity will become zero. However, since the window will continue to pan at a velocity that is determined by the position of the pointer, and since the window always pans in the direction that tends to reveal new content along the edge that is closest to the pointer, the result is that the pointer will move closer to the center of the window. Further, the velocity of window movement, as well as the apparent velocity of the pointer, will decrease as the pointer arrives closer towards center, and will eventually become zero when the pointer is returned to the boundary of the indicated rectangle.

In summary, the user can adjust the position of the display window by moving the pointer in the direction where he wishes to reveal more content. The window will begin to move when the pointer moves beyond a threshold distance from center. The velocity of movement can be controlled by adjusting the distance of the pointer from center and the user can stop panning either by moving the pointer back to within threshold distance or by lifting his finger from the screen and allowing the window to deaccelerate on its own. The process is described in detail by the flowchart in FIGS. 11A and 11B. In this case, the current pointer position is (x, y), the threshold distance before window movement occurs is $(X_t, Y_t)$, the display window is centered at coordinates $(W_x, W_y)$ within the larger application window, the current window velocity is $(W_{vx}, W_{vy})$, and the velocity increases linearly to a maximum of $(V_{max}, V_{max})$ attained when the pointer is positioned at the edge of the window. The flowchart also maintains a state variable show_pointer and parameters pointer_on_delay and pointer_off_delay. The intention is to display the pointer shortly after the user touches the pad (after a delay of pointer_on_delay) and to hide the pointer shortly after the user lifts his finger from the surface of the pad (after a delay of pointer_off_delay).

Figure 11A:
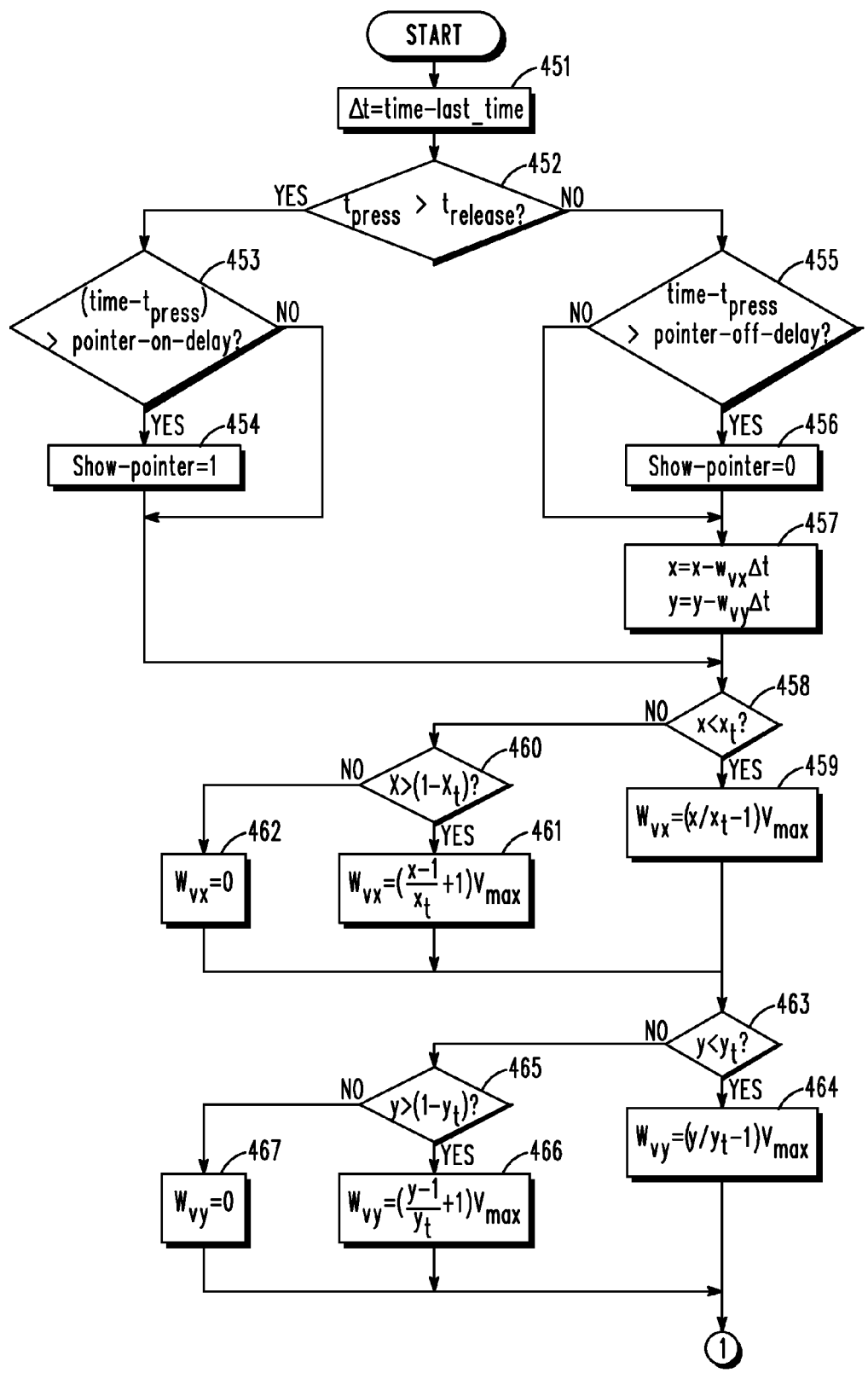
FIGS. 11A and 11B illustrate flowcharts of a process for controlling the velocity of movement by adjusting the distance of the pointer from center and stop panning either by moving the pointer back to within threshold distance or by lifting a finger from the screen and allowing the window to decelerate on its own according to one embodiment of the present inventions.
Figure 11B:
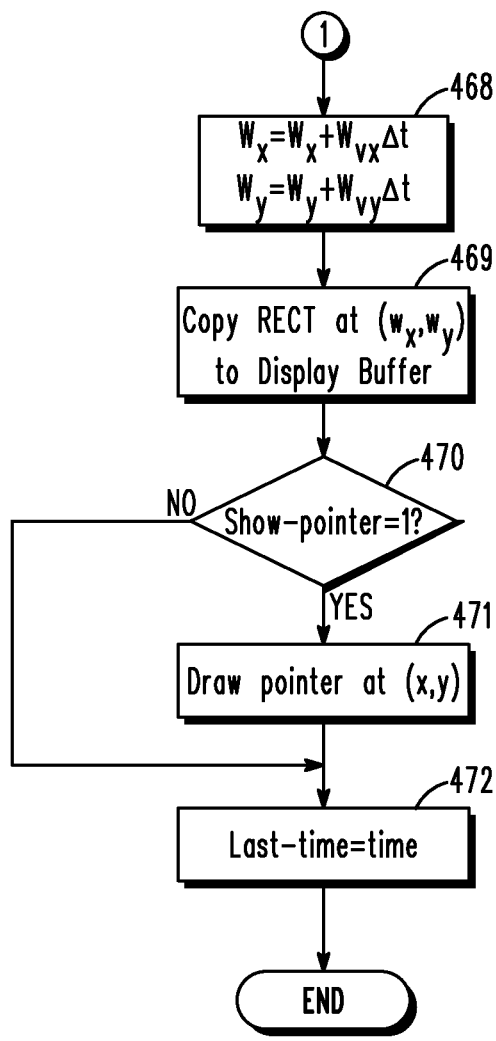

The flowchart of FIGS. 11A and 11B executes at the start of each frame display interval. This interval is recorded at step 451. Step 452 determines if the touchpad or touchscreen is currently being touched. If touched, then drawing of the pointer is enabled at step 454 if is determined at step 453 that a sufficient interval has transpired since the time that the touch occurred. Similarly, drawing of the pointer is disabled at step 456 if the touchpad or touchscreen is not currently touched and if it is determined at step 455 that a sufficiently long interval has transpired since the time that the touch was released. Once released, the position of the pointer continues to be updated at step 457 as the velocity decelerates to 0. If it is determined at step 458 that the horizontal pointer position is less than the minimum threshold defined by rectangle 222, then a negative horizontal velocity is derived at step 459. Otherwise, if it is determined at step 460 that the horizontal pointer position exceeds the maximum threshold defined by rectangle 222, then a positive horizontal velocity is derived at step 461. Otherwise the horizontal velocity component is set to 0 at step 462. Similarly, if it is determined at step 463 that the vertical pointer position is less than the minimum threshold defined by rectangle 222, then a negative vertical velocity is derived at step 464. Otherwise, if it is determined at step 465 that the vertical pointer position exceeds the maximum threshold defined by rectangle 222, then a positive vertical velocity is derived at step 466. Otherwise the vertical velocity component is set to 0 at step 467. The resulting velocity is applied to determine the new position of display window 211 at step 468 and the window is rendered to the display at step 469. The pointer is also rendered to the display at step 471 if it is determined at step 470 that the pointer is currently enabled. Finally, the current time is recorded at step 472.

A third and preferred method of navigation using a touchpad input device is to use one digit as before to position the pointer 220. In this case, however, the movement of the display window 211 within the larger application window 210 is controlled by adjusting the orientation of the touchpad device. For example, if the pad is tilted to the right, then the display window could pan to the right, and if the pad is tilted to the left, then the display window could pan to the left. Similarly, the display window could be positioned towards the top of the application window by tilting the top of the pad downwards, or the window could be positioned towards the bottom of the application window by tilting the top of the pad upwards. The panning speed could be controlled by adjusting the angle of tilt. Unintended movement of the display window can be avoided by disabling this procedure when the pad is not being touched. For example, movement of the display window can be enabled by touching a single digit to the pad for a minimum time interval. This action also establishes the current orientation and tilt as a reference. After this interval, the position of the display window would then respond to incremental differences between the current orientation and tilt of the pad and the established reference. When the digit is lifted such that it is no longer in contact with the pad, movement of the display window would be disabled immediately and the last position of the display window would be maintained.

The combination of touchpad or touchscreen with suitable interface software can serve as an effective and efficient user interface in a television viewing environment. Methods for managing pointer position and object identification, object selection, zooming, and panning have been described. Occasionally there may also be a need for keyboard input. The need for keyboard input is usually obvious to the user, and in most cases, is initiated by the user by first moving the pointer to a section of a web page reserved for keyboard entry, or the text window of an email or document preparation application.

When characters are subsequently types on a keyboard, they are automatically passed to the associated application by X server 101 in FIGS. 1 and 2 or Xvnc server 120 in FIGS. 3 and 4. However, in television viewing settings, a keyboard is not likely to exist and therefore the remote control, touchscreen or touchpad must be used instead. In the case of a touchscreen or touchpad, the first step is to signal the input device to switch to keyboard entry mode. Although this signal could come directly from the user, this signaling method comes with the disadvantage of having to provide a dedicated button on the touchscreen or main display, or having to reserve a particular touch gesture to be applied by the user when he wishes to enter text. Such actions may be triggered accidentally if made available to the user on a continuing basis. Further, one must also assume that this decision by the user aligns with the application's ability to receive text at any given time.

A more convenient option for signaling the touchscreen or touchpad to switch to keyboard entry mode is to allow the application to initiate the switch. That is, if the user moves the pointer to a text-entry window of a web page and selects the window, or if the user moves the pointer to a text-entry window of an email or document entry application, then a virtual keyboard may automatically appear on the touchpad screen or on the main screen in the case of the touchpad.

In some systems, it may be possible to infer the need for keyboard entry without communicating with the application itself. For example, X servers 101 in FIGS. 1 and 2 and Xvnc server 120 in FIGS. 3 and 4 typically include distinct and accessible modules for displaying a particular cursor when text entry is needed. In most cases, the cursor is likely to appear as a flashing or solid vertical line only after a text entry window has been selected by the user. In the case of VNC, the presence and appearance of the cursor can be inferred directly from the RFB protocol used for communication between server and client(s). It is often possible to infer the need for keyboard input based on the state of the VNC cursor.

One of the most effective steps that can be taken to improve the usability of user interfaces lacking full-sized physical keyboards is to design the user interface such that the need for keyboard input is minimized. Although this may not be practical for document entry or email composing applications, there are several steps that can be taken when keyboard entry is limited to search strings and URLs.

For example, FIGS. 12A, 23 B and 12C illustrate three screens that could be easily accessed by the user. FIG. 12A illustrates a home page 500 which may be accessed at any time by reserving a unique action such as double tapping the touchpad or touchscreen with a singe digit. When this happens, the home page 500 is automatically displayed and the previous activity is placed on hold. For example, if the user was watching a video program, then the position within the program would be recorded, and if the program does not already exist in local storage (for example during live streaming), then the remainder of the program would be copied to local storage. At the same time, a new tile 510 would be added to the home screen to serve as a shortcut allowing the user to easily resume where he left off. In this case, the tile could reveal a thumbnail image of a video frame occurring at the point where the program was paused.

Over time, a number of tiles 510 would be collected and displayed to the user each time he returns to his home page. The tiles may represent not only shortcuts to paused video programs, but also shortcuts to music files, photo slide shows, recently visited web pages, or partially completed email compositions. Instead of managing multiple tabs within the web browser, the user could double tap his touchpad to return to his home screen while automatically creating a new short cut tile 510 to the web page at the same time. If the user intended to switch to a new web page, then he may conveniently do so from the home page.

One way to open a new page would be to select the "Search" tile 511 shown at the top left of home page 500. Selecting this tile also causes a virtual keyboard to appear on the main display and/or the user's hand-held touchscreen if such a device is being used. In the case of a media player device, it is advantageous to submit the search string to an internal data base management system maintaining the local media library, or the search string should be submitted to an internet-based search engine when insufficient local information exists. The user may also be provided with the option of entering a URL instead of searching. In either case, the amount of typing may be further reduced by listing possible matches as each new character is entered and allowing the user to select from the resulting list.

Alternatively, the user may select and open a previously visited page by choosing any of the other tiles 510 on the home page 500. In this example, the user may also select from the tiles 520 on the bookmark page 501 shown in FIG. 12B. Since, in this case, the bookmark page 501 is horizontally adjacent to the home page 500, the user could visit simply by swiping one finger from right to left. From the bookmark page 501, the options are to select or edit an existing bookmark represented by tiles 520, return to home page 500 by swiping with one finger from left to right, or swipe one finger from right to left to move to the third page 502 of tiles shown in FIG. 12C. This page 502 is generated automatically and includes tiles 530 corresponding to the most visited web sites, video programs, music collections, slide shows, or documents. The list may be sorted according to content format and/or frequency of use. From this page, the user may either select form one of the tiles 530 shown on this page, or return to the bookmark page 501 by swiping one finger from left to right, or return to the home page 500 by swiping one finger from right to left.

The main difference between the bookmark page 501 in FIG. 12B and the most-visited page 502 in FIG. 12C is that the bookmark page is managed by the user. A convenient touchpad-friendly mechanism should be provided to allow media sessions and visited web pages to be added to the bookmark page. One way to do this is to first allow a session to be added to the home page. If the session has not yet been entered into the home page, then the user only needs to return to the home page while the session is active (by double-tapping for example) in order to simultaneously pause the session and add it to the home page. The tile can then be copied from the home page to the bookmark page in various ways. For example, the user might swipe two fingers from left to right once the tile has been highlighted on the home page screen. This action is intuitive since the bookmark page is positioned horizontally to the right of the home page. A similar action might be reserved for removing tiles from the bookmark page. For example, after moving to the bookmark page, the user might select the tile in the usual way, and then swipe with two fingers (perhaps from bottom to top of pad) in order to remove the tile from the screen.

The home page illustrated in FIG. 12A includes a reserved tile 511 for keyboard-based searching and direct URL entry. It also includes a second reserved tile 512 for launching a system configuration application. Additional tiles could be reserved for browsing the local media library, launching a video conferencing application, or some other application of choice. In FIG. 12A the remaining tiles 510 are assigned as new sessions are interrupted. Each new session might be added to the top of the list in order to assume highest priority. In order to limit memory consumption, a limit may be placed on the number of tiles that can be added to the home page. Once this cap has been reached, the oldest session may be deleted at the time that the next new session is added. Alternatively, if a new session is added, and the same session already exists in the home page, then the new session may be dropped while the preexisting tile corresponding to the same session is moved to the top of the list. Note that this policy should only be applied if the two sessions really are identical. While two web browsing sessions to the same URL address may clearly be identical, a video playback session may be classified as unique and different when compared to a saved session representing the same program interrupted at a different point in time.

Figure 13:
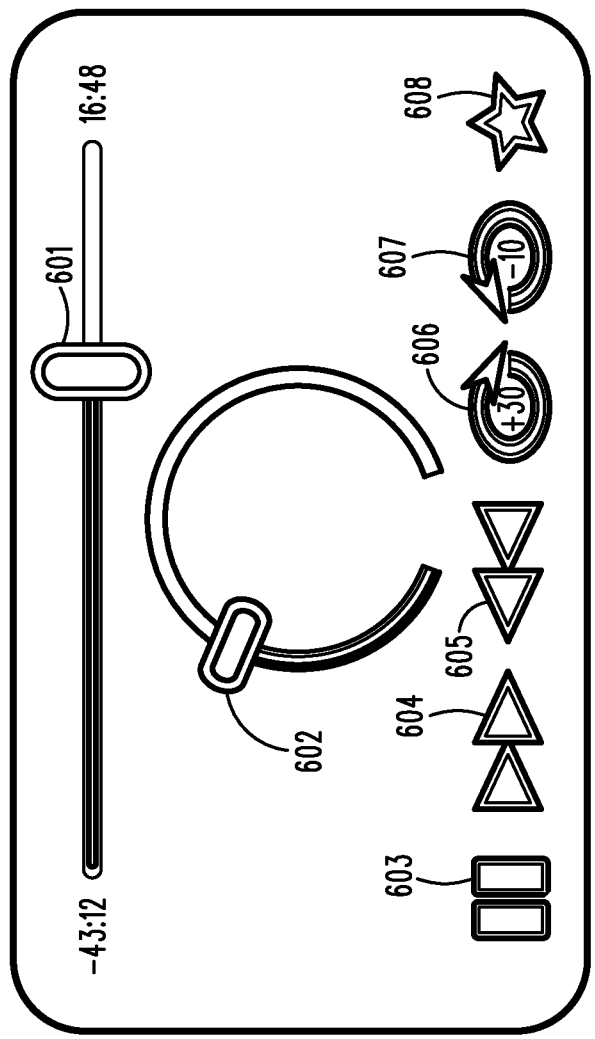
FIG. 13 illustrates a viewing screen with a set of options relevant to a current viewing according to one embodiment of the present inventions.

Typical computer applications such as web browsers, email clients, and document reviewers or editors generally receive user input in the form of key presses, mouse clicks, and pointer movements generated by a traditional keyboard and mouse combination. A touchpad or touchscreen can replace the keyboard and mouse using methods that have already been described. The same touchpad or touchscreen can also serve as an efficient user input device replacing the traditional remote control used for viewing television. For example when touchpad input is received, a set of options that are relevant to the current viewing state may be illustrated on the viewing screen as shown in FIG. 13. In this case, slider 601 at the top of the screen is used to jump to random points within the program that is currently being viewed. The slider may be selected by touching a finger or thumb to the top half of the touchpad and holding it down until the slider is highlighted. Once highlighted, the playback position may be advanced by sliding the finger horizontally to the right, or the playback position can be shifted backwards by sliding the finger horizontally to the left. The circular object 602 is used to adjust the playback volume. The volume level can be raised by touching two fingers to the touchpad and rotating clockwise. Similarly, the volume can be reduced by rotating the two fingers counter-clockwise. The objects on the bottom row of FIG. 13 enable typical functions useful to a media viewing application. Listed from left to right, the corresponding object functions are pause 603, fast forward 604, fast reverse 605, jump 30 seconds forward 606, jump 10 seconds backwards 607, and bookmark 608. These functions may be selected by touching the bottom half of the touchpad with a single finger. This may cause the most recently accessed object to be highlighted. A different object may be highlighted by sliding the finger to the left or right in much the same way that a pointer is moved to select nearby objects or links in a web browser application. However, this is an example of an application where navigation convenience is improved by not revealing a pointer and highlighting an object instead. In this case, the next object is immediately highlighted as the previous object is de-highlighted in response to a finger movement to the left or right. The user can select a highlighted object and trigger a corresponding action by lifting the finger from the pad and then quickly tapping the pad once. However, if the user waits too long before tapping the pad (for example, more than 3 seconds), then the object will cease to be highlighted and the tap will have no effect. This precaution is useful to protect against unintended contact with the touchpad surface while the device is being handled.

The signal processing techniques disclosed herein with reference to the accompanying drawings are preferably implemented on one or more digital signal processors (DSPs) or other microprocessors. Nevertheless, such techniques could instead be implemented wholly or partially as discrete components or hardwired circuits. Further, it is appreciated by those of skill in the art that certain well known digital processing techniques are mathematically equivalent to one another and can be represented in different ways depending on choice of implementation.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. A system for conveying and reproducing images for use with interactive applications, said system comprising:
    one or more interactive application modules producing images for display with selected characteristics responsive to user input;
    a display server operatively coupled to said one or more interactive application modules to encode initial encoded representations of said images with the selected characteristics and to modify the initial encoded representations responsive to the user input forwarded thereto to derive modified encoded representations;
    one or more clients, each including:
        one or more user input devices operatively coupled to said display server to generate said user input and forward said user input to said display server;
        a virtual client display operatively coupled to said display server to receive and reconstruct the initial encoded representations of said images with the selected characteristics to form a first image reconstruction;
        a graphics processing unit operatively coupled to said display, said one or more user input devices and to said virtual client display to modify said first image reconstruction in response to said user input from said one or more user input devices to produce a second image reconstruction;
        wherein the virtual client display is operatively coupled to said display server to further receive and reconstruct the modified encoded representations of said images with the selected characteristics to form a modified image reconstruction; and
        a display operatively coupled to said virtual client display to sequentially display the first image reconstruction, the second image reconstruction, and the modified image reconstruction in this order.

2. A system according to claim 1 further comprising a window display controller operatively coupled to said graphics processing unit to manage said graphics processing unit.

3. A system according to claim 2 wherein said window display controller is responsive to said user input received from said one or more user input devices.

4. A system according to claim 3 wherein said window display controller is responsive to said encoded representations of images received from said display server.

5. A system according to claim 1 wherein said virtual client display performs communications with said display server of said one or more clients in accordance with a VNC protocol.

6. A system according to claim 1 wherein at least one of said one or more interactive application modules comprises a web browser.

7. A system according to claim 1 wherein at least one of said one or more user input devices comprises a touchscreen.

8. A system according to claim 1 wherein at least one of said one or more user input devices comprises a touchpad.

9. A system according to claim 4, wherein said second image reconstruction produced by said graphics processing unit corresponds to a contiguous region of pixels comprising a subset of said first image reconstruction.

10. A system according to claim 9, wherein said subset of said first image reconstruction forms a rectangle with dimensions and position provided by said window display controller in response to information received from said one or more user input devices.

11. A system according to claim 10 further comprising video memory in said one or more clients for storing a third image reconstruction, wherein said first image reconstruction is a subset of said third image reconstruction.

12. A system according to claim 11 wherein said window display controller sends information causing one of said one or more interactive application modules to change the position of said first image reconstruction within said third image reconstruction.

13. A system according to claim 12 wherein at least one of said user input devices comprises a tilt-sensitive user input device sensitive to tilt and said window display controller causes said first image reconstruction to be repositioned within said third image reconstruction in a direction corresponding to the direction of tilt detected by said tilt-sensitive user input device.

14. A system according to claim 13 wherein said window display controller causes said first image reconstruction to be repositioned within said third image reconstruction at a rate corresponding to the amount of tilt detected by said tilt-sensitive user input device.

15. A system according to claim 14 wherein said tilt-sensitive user input device is also sensitive to touch and said repositioning of the first image reconstruction within said third image reconstruction is disabled if a touch is not detected simultaneously with the detection of tilt.

16. A system according to claim 12 wherein said window display controller causes said first image reconstruction to be repositioned within said third image reconstruction in a direction that is responsive to the position corresponding to said second image reconstruction within said first image reconstruction.

17. A system according to claim 16 wherein said window display controller causes said first image reconstruction to be repositioned within said third image reconstruction at a rate that is responsive to the position corresponding to said second image reconstruction within said first image reconstruction.

18. A method of conveying and reproducing images for use with interactive applications, said method comprising the steps of:
- (a) producing images for display with selected characteristics responsive to user input in one or more interactive application modules on a display server;
- (b) encoding initial encoded representations of the images produced in said step (a) with the selected characteristics in a display server;
- (c) modifying the initial encoded representations encoded in said step (b) responsive to the user input forwarded thereto to derive modified encoded representations in the display server;
- (d) generating the user input by one or more user input devices in one or more clients;
- (e) forwarding the user input generated in said step (d) from one or more clients to the display server;
- (f) receiving and reconstructing in one or more clients the initial encoded representations of the images from said step (b) with the selected characteristics to form a first image reconstruction;
- (g) displaying on one or more clients the first image reconstruction formed in said step (f);
- (h) modifying the first image reconstruction by a graphics processing unit in one or more clients in response to the user input by the one or more user input devices in the one or more clients to produce a second image reconstruction;
- (i) displaying on one or more clients the second image reconstruction formed in said step (h);
- (j) receiving and reconstructing in one or more clients the modified encoded representations of the images with the selected characteristics to form a modified image reconstruction; and
- (k) displaying on one or more clients the modified image reconstruction formed in said step (j).

19. A method according to claim 18, wherein the second image reconstruction formed by the graphics processing unit in said step (h) corresponds to a contiguous region of pixels comprising a subset of the first image reconstruction.

20. A method according to claim 18, further comprising the steps of
- (l) storing a third image reconstruction in a video memory of the one or more clients, wherein said first image reconstruction is a subset of said third image reconstruction; and
- (m) performing window display control by a graphics processing unit in the one or more clients causing the first image reconstruction repositioned within a third image reconstruction.

* * * * *